United States Patent
Ishihara et al.

(10) Patent No.: US 7,616,239 B2
(45) Date of Patent: Nov. 10, 2009

(54) METHOD AND APPARATUS FOR CORRECTING SMEAR IN A CHARGE-TRANSFER TYPE SOLID-STATE IMAGE PICK-UP DEVICE

(75) Inventors: Atsuhiko Ishihara, Asaka (JP);
Masakatsu Kubota, Asaka (JP);
Masaya Tamaru, Asaka (JP)

(73) Assignee: Fujifilm Corporation, Tokyo (JP)

( * ) Notice: Subject to any disclaimer, the term of this patent is extended or adjusted under 35 U.S.C. 154(b) by 863 days.

(21) Appl. No.: 11/231,894

(22) Filed: Sep. 22, 2005

(65) Prior Publication Data

US 2006/0072024 A1   Apr. 6, 2006

(30) Foreign Application Priority Data

Sep. 29, 2004 (JP) ............ P.2004-283741
Feb. 16, 2005 (JP) ............ P.2005-039286

(51) Int. Cl.
*H04N 9/64* (2006.01)
*H04N 3/14* (2006.01)

(52) U.S. Cl. ............ 348/249; 348/250; 348/280; 348/312; 348/315

(58) Field of Classification Search ............ None
See application file for complete search history.

(56) References Cited

U.S. PATENT DOCUMENTS 6,236,434 B1 * 5/2001 Yamada .............. 348/315
7,030,358 B2 * 4/2006 Misawa .............. 250/208.1
7,193,650 B2 * 3/2007 Oda et al. .............. 348/248
2002/0067415 A1 * 6/2002 Denyer et al. .............. 348/294
2004/0017498 A1 * 1/2004 Yamashita et al. .......... 348/315
2005/0168610 A1 * 8/2005 Kobayashi .................. 348/320

FOREIGN PATENT DOCUMENTS

JP    7-322148 A    12/1995
JP    8-37626 A    2/1996

* cited by examiner

*Primary Examiner*—Ngoc-Yen T Vu
(74) *Attorney, Agent, or Firm*—Birch, Stewart, Kolasch & Birch, LLP (57) ABSTRACT

A method for driving a charge-transfer type solid-state image pick-up device, wherein the charge-transfer type solid-state image pick-up device comprises: high sensitivity photoelectric conversion elements for executing photoelectric conversion with relatively high sensitivity; low sensitivity photoelectric conversion elements for executing photoelectric conversion with relatively low sensitivity; and vertical transfer channels for transferring signal charges from said high sensitivity photoelectric conversion elements and said low sensitivity photoelectric conversion elements, the method comprising a charge transfer step of individually reading/transferring first signal charges from said high sensitivity photoelectric conversion elements and second signal charges from said low sensitivity photoelectric conversion elements onto said vertical transfer channels, without executing a high speed charge transfer operation for the vertical transfer channels after exposure of said solid-state image pick-up device.

11 Claims, 7 Drawing Sheets

METHOD AND APPARATUS FOR CORRECTING SMEAR IN A CHARGE-TRANSFER TYPE SOLID-STATE IMAGE PICK-UP DEVICE

BACKGROUND OF THE INVENTION

1. Filed of the Invention

This invention relates to a method for driving a charge-transfer type solid-state image pick-up device comprising high sensitivity photoelectric conversion elements for executing photoelectric conversion with relatively high sensitivity, low sensitivity photoelectric conversion elements for executing photoelectric conversion with relatively low sensitivity and vertical transfer channels for transferring signal charges from said high sensitivity photoelectric conversion elements and said low sensitivity photoelectric conversion elements, an image pick-up method using this image pick-up device and an image pick-up apparatus using this image pick-up device.

2. Description of the Related Art

A charge-transfer type solid-state image pick-up device transfers a signal charge stored in each of photoelectric conversion elements according to a quantity of incident light to vertical transfer channels arranged adjacently to the photoelectric conversion elements, sequentially transfers the signal charges to a horizontal transfer channel through the vertical transfer channels and sequentially transfers the signal charges to a floating diffusion amplifier through the horizontal transfer channel so that a voltage signal corresponding to the signal charge is produced. In such a solid-state image pick-up device, if there is a high luminance region on an image pick-up screen, a smear phenomenon is likely to occur. This leads to deterioration in image quality. In order to suppress this phenomenon, prior to the transfer of the signal charge to the vertical transfer channels, a high speed sweeping operation of transferring the smear charge remaining on the vertical transfer channels at a high speed is carried out. The method for driving the high speed sweeping operation whenever the charge is read out is described in JP-A-7-322148.

Further, where the different image signals with high sensitivity and low sensitivity acquired with different exposure times are composed to expand the dynamic range, with the image signal with the low sensitivity being non-linearly amplified with the smear signal of the polarity opposite to that of the image signal with the high sensitivity, the image signals with the low sensitivity and the high sensitivity are added/composed so that the smear components cancel each other. Such a smear correcting method is described in JP-A-8-37626.

However, in the method described in JP-A-7-322148, since the high speed sweeping operation of the smear charge is carried out whenever the signal charge is read out, the read time taken for reading the entire image is lengthened. This may lead to a hitch for the high speed read-out such as a successive shot or snap shot. Further, in the method disclosed in JP-A-8-37626, the driving system must be switched between the cases of the high sensitivity and the low sensitivity. This makes the control required therefor complicate.

Meanwhile, in the solid-state image pick-up device employed in an image pick-up apparatus such as a digital camera, the charge corresponding to an image signal is detected by a photoelectric conversion element (hereinafter also referred to as a "pixel") so that it is generally difficult to extend the dynamic range. In order to obviate such an inconvenience, it has been proposed to obtain the image with a wide dynamic range by using the solid-state image pick-up device having photoelectric conversion elements with relatively high sensitivity (hereinafter also referred to as a "high sensitivity pixels") and other photoelectric conversion elements with relatively low sensitivity (hereinafter referred to as a "low sensitivity pixels") thereby to compose the high sensitivity image data from each the high sensitivity pixels and the low sensitivity image data from each the low sensitivity pixels.

Figure 7:
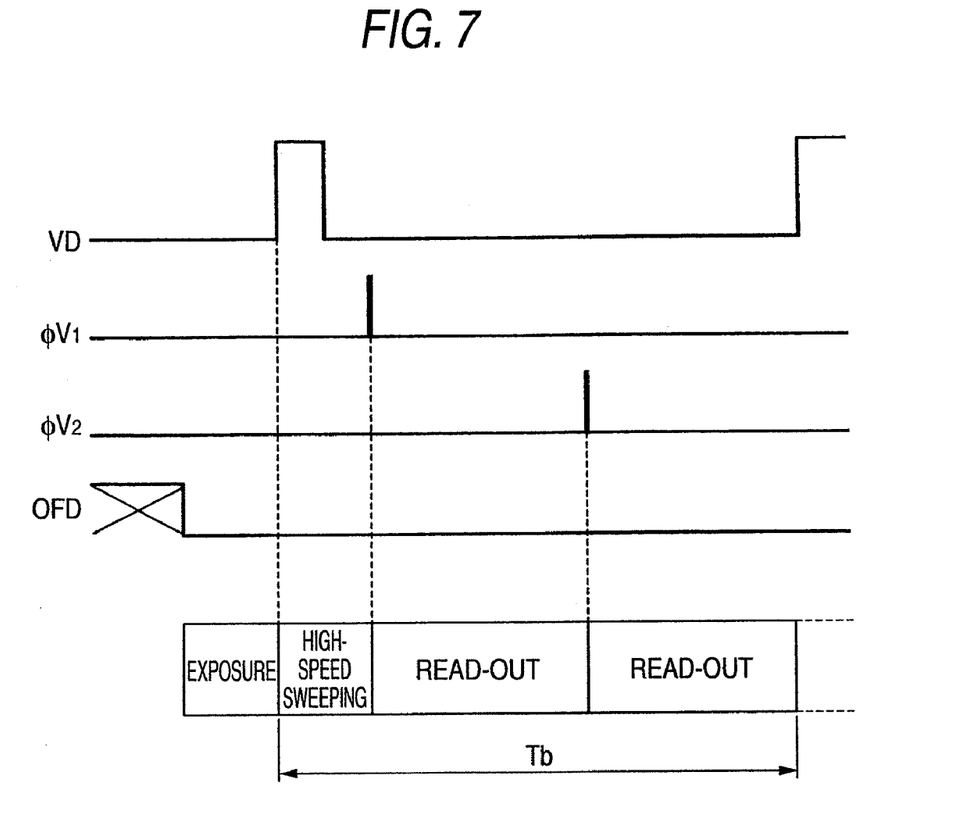
FIG. 7 is a timing chart for explaining a conventional driving method for the solid-state image pick-up device.

The timing chart for the driving method in this case is shown in FIG. 7. As shown in FIG. 7, even in this configuration, where the signal charges from the high sensitivity and low sensitivity pixels are read out after exposure in the photoelectric conversion elements, prior to this reading, the high speed sweeping operation is carried out to remove the smear charges remaining on the vertical transfer channels.

As described above, in either driving method, in image pick-up of a still image, if the high speed sweeping operation is carried out after a shutter is closed, the time Tb taken for reading the entire image is lengthened. Thus, for the successive shot or snap shot in which the solid-state image pick-up device is caused to perform a high speed sequential image pick-up operation, the interval between image pick-up operations cannot be sufficiently shortened. Further, in image pick-up of a moving image, if the high speed sweeping operation for removing the smear component is not performed, a field step may occur to increase the possibility of generating a flicker so that FPN (Fixed Pattern Noise) appears on the screen.

SUMMARY OF THE INVENTION

This invention has been accomplished in view of the circumstance described above. An object of this invention is to provide a method for driving a charge-transfer type solid-state image pick-up device capable of shorting the read time of an image signal while providing a configuration for removing a smear component in acquiring the image with a wide dynamic range using a solid-state image pick-up device having a photoelectric conversion element with high sensitivity and a photoelectric conversion element with low sensitivity, and an image pick-up method and apparatus using the image pick-up device.

The above object of this invention can be attained by the following configurations.

(1) A method for driving a charge-transfer type solid-state image pick-up device comprising high sensitivity photoelectric conversion elements for executing photoelectric conversion with relatively high sensitivity, low sensitivity photoelectric conversion elements for executing photoelectric conversion with relatively low sensitivity and vertical transfer channels for transferring signal charges from the high sensitivity photoelectric conversion elements and the low sensitivity photoelectric conversion elements, comprising a charge transfer step of individually reading/transferring the signal charges onto each the vertical transfer channels from the high sensitivity photoelectric conversion elements and the low sensitivity photoelectric conversion elements without executing a high speed charge transfer operation for the vertical transfer channels after exposure of the solid-state image pick-up device.

(2) A method for driving a charge-transfer type solid-state image pick-up device according to item (1), wherein the charge transfer step is to read/transfer the signal charges from the high sensitivity photoelectric conversion elements and thereafter to read/transfer the signal charges from the low sensitivity photoelectric conversion elements.

(3) An image pick-up method using a charge-transfer type solid-state image pick-up device comprising high sensitivity photoelectric conversion elements for executing photoelectric conversion with relatively high sensitivity, low sensitivity photoelectric conversion elements for executing photoelectric conversion with relatively low sensitivity and vertical transfer channels for transferring signal charges from the high sensitivity photoelectric conversion elements and the low sensitivity photoelectric conversion elements, comprising: a charge transfer step of individually reading/transferring the signal charges onto the vertical transfer channels from the high sensitivity photoelectric conversion elements and the low sensitivity photoelectric conversion elements without executing a high speed charge transfer operation for the vertical transfer channels after exposure of the solid-state image pick-up device; a smear component acquiring step of, using a signal based on the signal charges transferred from the photoelectric conversion elements and a signal based on the signal charges transferred from the low sensitivity photoelectric conversion elements, acquiring a smear component contained in the signal based on the transferred signal charges; and a smear component correcting step of correcting the signal based on the signal charges from the either one of the high sensitivity and low sensitivity photoelectric conversion elements using the smear component thus acquired.

(4) An image pick-up method according to item (3), wherein the charge transfer step is to read/transfer the signal charges from the high sensitivity photoelectric conversion elements and thereafter to read/transfer the signal charges from the low sensitivity photoelectric conversion elements; the smear component acquiring step is to acquire a smear component contained in the signal based on the signal charges from the high sensitivity photoelectric conversion elements; and the smear component correcting step is to correct the signal based on the signal charges from the high sensitivity photoelectric conversion elements.

(5) An image pick-up method according to item 3 or 4, further comprising: a saturation determining step of determining whether or not the signal based on the signal charges from the high sensitivity photoelectric conversion elements has been saturated, wherein the smear component acquiring step and the smear component correcting step are executed if in the saturation determining step it is determined that the signal based on the signal charges from the high sensitivity photoelectric conversion elements has not been saturated.

(6). An image pick-up method according to item 5, wherein the saturation determining step uses a signal based on the signal charges from the low sensitivity photoelectric conversion elements and a sensitivity ratio of the high sensitivity photoelectric conversion elements to the low sensitivity photoelectric conversion elements.

(7) An image pick-up apparatus comprising a solid-state image pick-up device, an image pick-up driving section that drives the solid-state image pick-up device and a signal processing unit that processes a signal from the solid-state image pick-up device to produce digital image data of a picked-up image, wherein the solid-state image pick-up device is a charge-transfer type solid-state image pick-up device including high sensitivity photoelectric conversion elements for executing photoelectric conversion with relatively high sensitivity, low sensitivity photoelectric conversion elements for executing photoelectric conversion with relatively low sensitivity and vertical transfer channels for transferring signal charges from the high sensitivity photoelectric conversion elements and the low sensitivity photoelectric conversion elements, thereby producing a signal based on the signal charges; the image pick-up driving section individually reads/transfers the signal charges onto the vertical transfer channels from the high sensitivity photoelectric conversion elements and the low sensitivity photoelectric conversion elements without executing a high speed charge transfer operation for the vertical transfer channels after exposure of the solid-state image pick-up device; and the signal processing section has a smear component acquiring function of, using a signal based on the signal charges transferred from the high sensitivity photoelectric conversion elements and a signal based on the signal charges transferred from the low sensitivity photoelectric conversion elements, acquiring a smear component contained in the signal based on the transferred signal charges, and a smear component correcting function of correcting the signal based on the signal charges from the either one of the high sensitivity and low sensitivity photoelectric conversion elements using the smear component thus acquired.

(8) An image pick-up apparatus according to item 7, wherein the image pick-up driving section reads/transfers the signal charges from the high sensitivity photoelectric conversion elements and thereafter reads/transfers the signal charges from the low sensitivity photoelectric conversion element; the smear component acquiring function is to acquire a smear component contained in the signal based on the signal charges from the high sensitivity photoelectric conversion elements; and the smear component correcting function is to correct the signal based on the signal charges from the high sensitivity photoelectric conversion elements.

(9) An image pick-up apparatus according to item 7 or 8, wherein the signal processing section has a saturation determining function of determining whether or not the signal based on the signal charges from the high sensitivity photoelectric conversion elements has been saturated, and the smear component acquiring function and the smear component correcting function are valid if in the saturation determining function it is determined that the signal based on the signal charges from the high sensitivity photoelectric conversion elements has not been saturated.

(10) An image pick-up apparatus according to item 9, wherein the saturation determining function is to determine whether or not the signal based on the signal charges from the high sensitivity photoelectric conversion elements has been saturated using the signal based on the signal charges from the low sensitivity photoelectric conversion elements and a sensitivity ratio of the high sensitivity photoelectric conversion elements to the low sensitivity photoelectric conversion elements.

(11) An image pick-up apparatus according to any one of items 7 to 10, wherein it has a sequential image pick-up mode of executing continuous image pick-up and the image pick-up driving section individually reads/transfers, in the sequential image pick-up mode, the signal charges onto the vertical transfer channels from the high sensitivity photoelectric conversion elements and the low sensitivity photoelectric conversion elements without executing a high speed charge transfer operation for the vertical transfer channels.

(12) An image pick-up apparatus according to any one of items 7 to 11, wherein the signal processing section creates digital image data of a picked-up image using the signal based on the signal charges from the high sensitivity photoelectric conversion elements.

(13) An image pick-up apparatus according to any one of items 7 to 12, wherein the signal processing section creates digital image data of a picked-up image by mixing the signal based on the signal charges from the high sensitivity photoelectric conversion elements with the signal based on the signal charges from the low sensitivity photoelectric conversion elements.

DETAILED DESCRIPTION OF THE INVENTION

Figure 1:
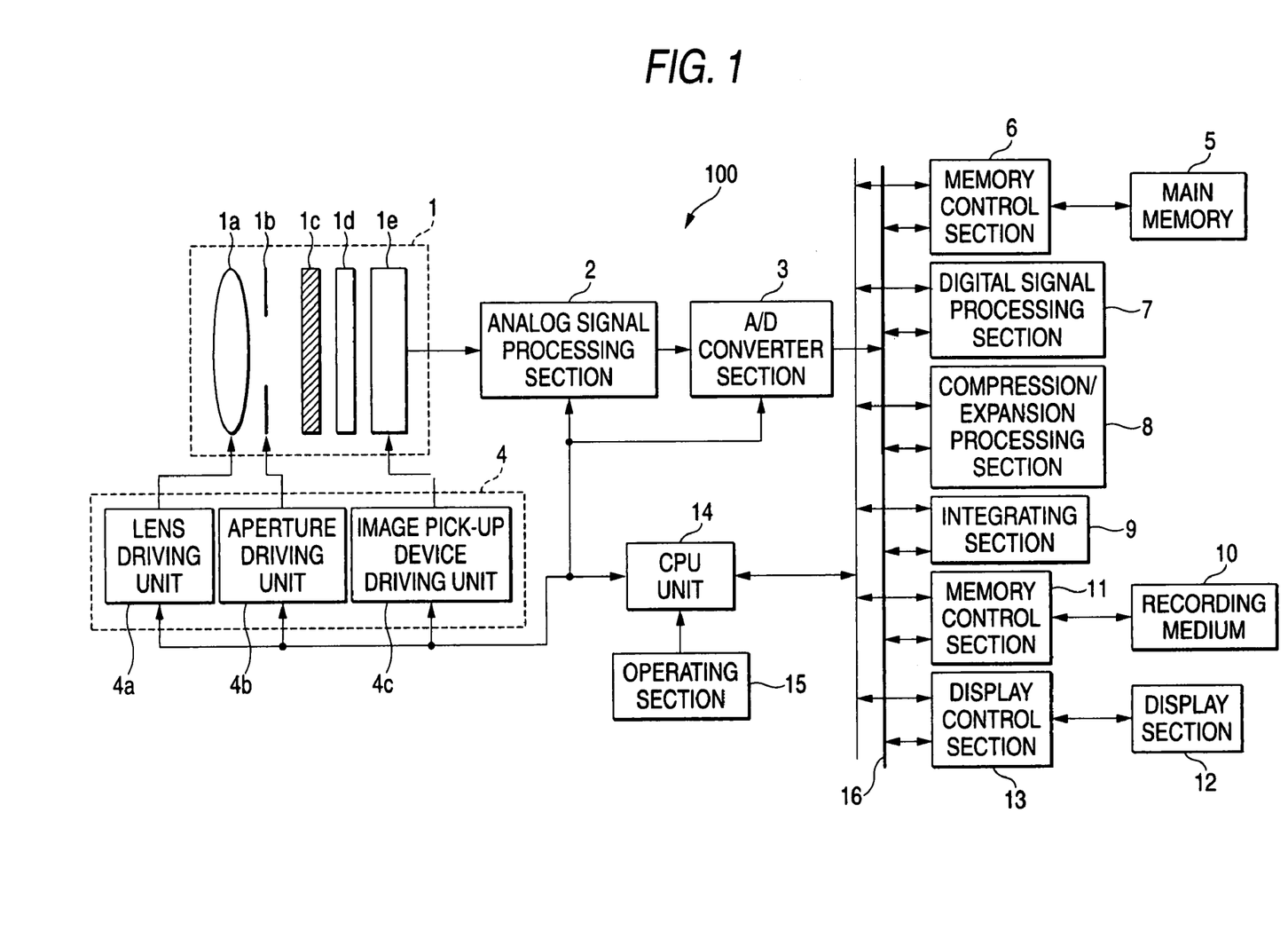
FIG. 1 is a view showing the schematic arrangement of a digital camera which is an embodiment of the image pick-up apparatus according to this invention.

Now referring to the drawings, a detailed explanation will be given of the best mode for carrying out the invention of the method for driving a charge-transfer type solid-state image pick-up device and an image pick-up method and apparatus using the image pick-up device according to this invention, FIG. 1 is a view showing the schematic arrangement of a digital camera which is an embodiment of the image pick-up apparatus according to this invention. Referring to FIG. 1, a digital camera 100 includes an image pick-up section 1, an analog signal processing section 2, an A/D converter section 3, a driving section 4, a memory controller section 6 connected to a main memory 5, a digital signal processing section 7, a compression/expansion processing section 8, an integrating section 9, a memory controller section 11 detachably equipped with a recording medium 10, a display section 12, a display controller section 13 for controlling the display section, an CPU unit 14 serving as a system controlling section and an operating section 15. And the memory controller section 6, digital signal processing section 7, compression/expansion processing section 8, integrating section 9, memory controller section 11 and display controller section 13 are connected to a system bus 16.

The image pick-up section 1 includes an optical system such as an image pick-up lens 1a, an aperture 1b and an optical filter (infrared absorbing filter 1c and LPF 1d) and a solid-state image pick-up device 1e and serves to pick up an object to produce an analog image picked-up signal. The image pick-up signal obtained in the image pick-up section 1 is supplied to the analog signal processing section 2 in which the picked up signal is subjected to predetermined analog signal processing. The analog signal thus obtained is converted into a digital signal in an A/D conversion section 3 which is in turn supplied to the digital signal processing section 7 and others. The details of the solid-state image pick-up device 1e will be described later.

In image pick-up, the image pick-up section 1 is controlled by means of the driving section 4. The charge-transfer type solid-state image pick-up device 1e such as a CCD image sensor has a plurality of photoelectric conversion elements (e.g. photodiodes) arranged in a row direction and a column direction orthogonal thereto on the surface of a semiconductor substrate to produce an analog voltage signal based on the signal charge generated and stored correspondingly to incident light. The solid-state image pick-up device 1e is driven by a driving signal from a timing generator (not shown) included in the driving section 4 at a predetermined timing in response to turn-on of a release switch by the operation of a shutter release button and others of the operating section 15.

The driving section 4 produces a predetermined driving signal under the control of the CPU unit 14 and includes a lens driving unit 4a, an aperture driving unit 4b, an image pick-up device driving unit 4c, etc. The image pick-up device driving unit 4c, whose details will be described later, reads and transfers the signal charge from the photoelectric conversion elements after exposure of the solid-state image pick-up device. The driving section 4 produces a driving signal for the analog signal processing section 2 and the A/D conversion section 3.

The memory control section 6 is connected to a main memory 5 which stores the programs of various image pick-up modes programmed according to various image pick-up scenes.

The digital signal processing section 7 subjects the digital image data from the A/D conversion section 3 to the digital signal processing corresponding to the operation mode designated by the operation section 15, and is constructed of e.g. a DSP (digital signal processor). The processing performed by the digital signal processing section 7 includes, in addition to black-level correcting processing (OB processing), linear matrix correcting processing (processing for removing a color mixture component due to the photoelectric conversion characteristic of the image pick-up device for a primary color signal from the image pick-up section, which is carried out through the 3×3 matrix operation for RGB inputs), white balance adjusting processing (gain adjustment), γ-correction processing, image composition processing, coincidence processing and Y/C conversion processing, a smear component acquiring function, a smear component correcting function and a saturation determining function. A detailed explanation will be later given of the smear component acquiring function, smear component correcting function, saturation determining function and image composition processing.

The compression/expansion processing section 8 subjects the Y/C data obtained in the digital signal processing section 7 to compression processing, and subjects the compressed image data obtained by the recording medium 10 to expansion processing.

The integrating section 9 serves to integrate the output signals from a solid-state image pick-up device 1e during the in-focus operation by the lens driving unit 4a thereby to acquire the brightness of an object and white balance control data.

The memory control section 11 serves to perform data input/output between itself and the recording medium 10 such as a memory card.

The display control section 13 serves to control the display section 12 including e.g. an LCD device. The display section 12 serves to display the image based on the image data picked up and subjected to the digital signal processing, and the image based on the image data acquired by subjecting the compressed image data recorded on the recording medium 10 to the expansion processing. Further, the slewing image during image pick-up, various states of the digital camera and the information relative to the operation can be also displayed.

The main memory 5 is e.g. DRAM. The main memory 5 is used as a work memory for the digital signal processing section 7 and CPU unit 14. The main memory 5 is also used as a buffer memory which temporarily stores the picked-up image data recorded on the recording medium 10 or a buffer memory for the image data displayed on the display section 12.

The CPU unit 14 serves to control the entire digital camera including an image pick-up operation. Concretely, the CPU unit 14 is mainly constructed of a processor operated according to a predetermined program.

The operating section 15 performs various operations when the digital camera is used. The operating section 15 serves to set an operating mode (image pick-up mode, reproducing mode, etc.) of the digital camera, a pick-up method during pick-up and a pick-up condition. The operating section 15 may be provided with operating members corresponding to their respective functions, respectively, but these operating members may be commonly used relatively to the display of the display section 12. Further, the operating section 15 includes a shutter release lens for actuating the image pick-up operation.

A detailed explanation will be given of the configuration of the solid-state image pick-up device 1e.

The solid-state image pick-up device 1e is a charge-transfer type solid-state image pick-up device such as a CCD image sensor, and has a plurality of photoelectric conversion elements arranged in a row direction and a column direction orthogonal thereto on the surface of a semiconductor substrate to produce an analog voltage signal based on the signal charge generated and stored correspondingly to incident light. The plurality of photoelectric conversion elements include high sensitivity photoelectric conversion elements for executing photoelectric conversion with relatively high sensitivity and low sensitivity photoelectric conversion elements for executing photoelectric conversion with relatively low sensitivity.

The solid-state image pick-up device 1e is driven by a driving signal from a timing generator included in the driving section 4 at a predetermined timing in response to turn-on of a release switch by the operation of a shutter release button which is a part of the operating section 15.

Figure 2:
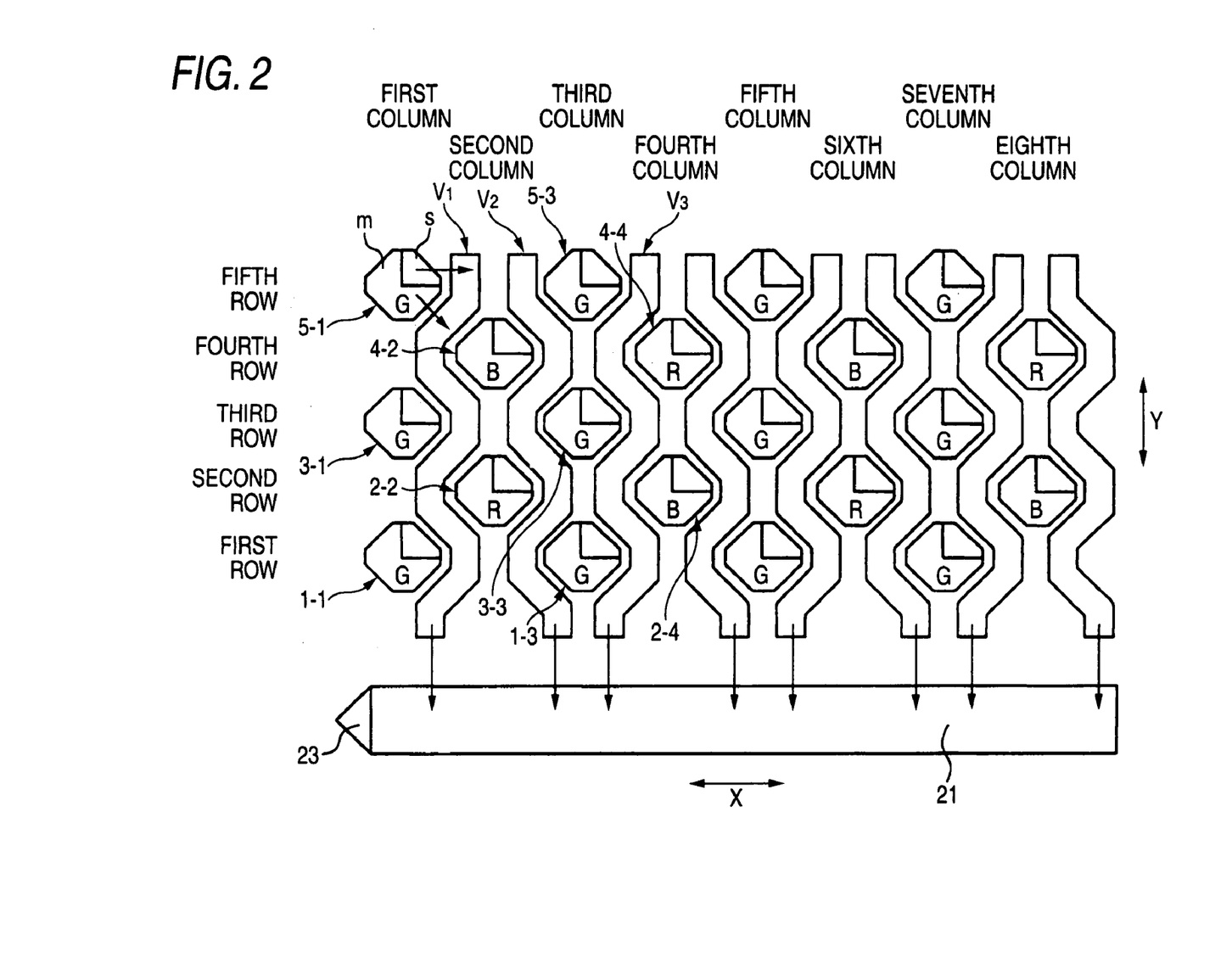
FIG. 2 is a partially enlarge plan view of the solid-state image pick-up device with divided pixels.

FIG. 2 is a partially enlarged plan view of the solid-state image pick-up device in a honeycomb structure with divided pixels. The solid-state image pick-up device includes a plurality of photoelectric conversion regions 1-1, 1-3, . . . 2-2, 2-4, 3-1, 3-3, . . . , 4-2, 4-4, . . . 5-1, 5-3, . . . (only some elements are assigned numbers in the figure) arranged in a row direction (indicated by arrow X) and a column direction (indicated by arrow Y) orthogonal thereto on the surface of a semiconductor substrate; vertical transfer segments V1, V2, V3; a horizontal transfer segment 21 and an output segment 23. Among the plurality of photoelectric conversion elements 1-1, 1-3, . . . , the photoelectric conversion regions at odd columns are deviated from those at even rows by approximately ½ of the arrangement pitch of the photoelectric conversion regions in the column direction. The photoelectric conversion regions at odd rows are deviated from those at even rows by approximately ½ of the arrangement pitch of the photoelectric conversion regions in the row direction. Incidentally, in FIG. 2, the photoelectric conversion regions of five rows and eight columns are shown, but actually, a further large number of photoelectric conversion regions are arranged.

The photoelectric conversion regions 1-1, 1-3, . . . each servers to produce an analog voltage signal based on the signal charge generated and stored correspondingly to incident light, and may be e.g. photodiodes. The photoelectric conversion regions 1-1, 1-3, . . . each is divided into a main region m having a relatively wide area and a subsidiary region s having a relatively narrow area (In FIG. 2, only the photoelectric conversion region 5-1 is assigned symbols) which generate and store the signal charge corresponding to the light with a predetermined spectral sensitivity, respectively. Thus, the main region m serves as a photoelectric conversion element for executing relatively high sensitivity photoelectric conversion, and the subsidiary region s serves as a photoelectric conversion element for executing relatively low sensitivity photoelectric conversion. In the solid-state image pick-up device shown in FIG. 2, the filter of a red (R), green (G) or blue (B) although not shown is arranged above each of the photoelectric conversion regions 1-1, 1-3, . . . to generate and store the signal charge corresponding the individual color light.

Figure 3:
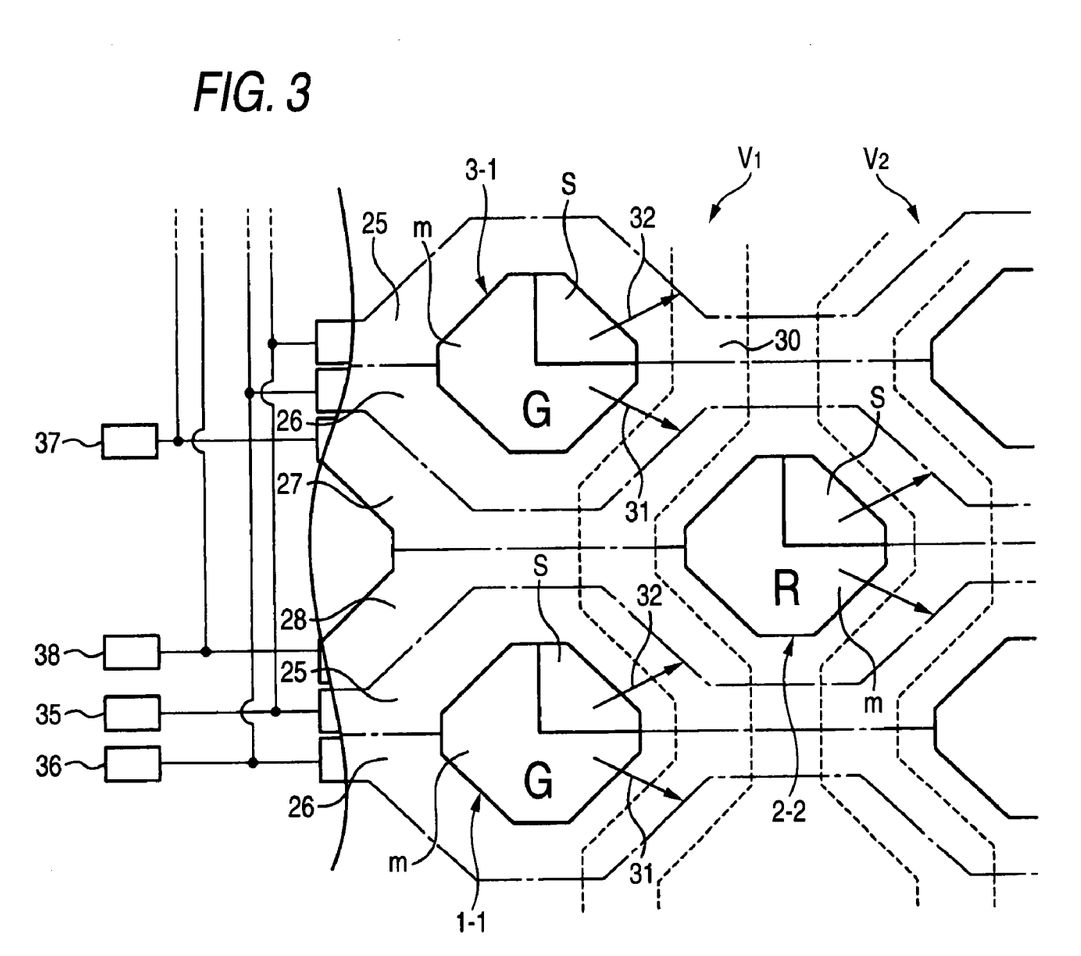
FIG. 3 is an enlarged view showing apart of the photoelectric conversion regions and the corresponding vertical transfer segments of FIG. 2.

FIG. 3 shows, in an enlarged view, apart of the photoelectric conversion regions and the corresponding vertical transfer segments of FIG. 2. The vertical transfer segment V1 includes a vertical transfer channel 30 formed in the column direction on the semiconductor substrate to transfer the signal charge from each of the photoelectric conversion regions 1-1, 3-1, . . . , a plurality of vertical transfer electrodes 25, 26 formed as overlying layers of the vertical transfer channel 30, a first charge reading region 31 (schematically indicated by arrow) for reading out the signal charge from the main region m corresponding to the high sensitivity photoelectric conversion element onto the vertical transfer channel 30 and a second charge reading region 32 (schematically indicated by arrow) for reading out the signal charge from the subsidiary region s corresponding to the low sensitivity photoelectric conversion element onto the vertical transfer channel 30. Incidentally, the vertical transfer electrodes 25, 26 are commonly arranged correspondingly to the odd column such as V1, and vertical transfer electrodes 27, 28 are commonly arranged correspondingly to the even column such as V2. As the case may be, the vertical transfer electrodes 25, 26, 27, 28 are arranged to form a meandering shape wholly extending in the row direction among the plurality of photoelectric conversion elements, respectively.

The vertical transfer channel 30 is formed in a nearly linear shape extending in the column direction Y aside the photoelectric conversion elements. Its region where the charge is stored and transferred is partitioned by the vertical transfer electrodes 25, 26 formed as the overlying layer. The vertical transfer electrodes 25, 26 are individually provided correspondingly to the main region m and subsidiary region s of the photoelectric conversion region, respectively. The vertical transfer electrodes 25, 26 in the same positional relationship in the photoelectric conversion elements at the same row are electrically connected to one another. Incidentally, the vertical transfer electrodes 25, 26 (and 27, 28) are made of polycrystalline silicon or the like.

The vertical transfer segment V1 sequentially reads the signal charge from the photoelectric conversion region (main region m and subsidiary region s) to the vertical channels 30 and drives the vertical transfer electrodes 25, 26 at predetermined timings to transfer the signal charge in the column direction. The vertical transfer electrodes 25, 26 are supplied with pulses (hereinafter also referred to as driving pulses) through terminals 35, 36 so that the signal charge on the vertical transfer channel 30 is transferred in the column direction.

Incidentally, the vertical transfer segment V2 adjacent to the vertical transfer segment V1 is provided with two vertical transfer electrodes 27, 28 which are deviated and different from the vertical transfer electrodes 25, 26 by ½ of the arrangement pitch in the column direction. Thus, in the solid-state image pick-up device 1e, the four kinds of the vertical transfer electrodes 25, 26, 27, 28 are supplied with either one of the driving pulses in the first to fourth phases, so that the charge signal of each of the photoelectric conversion regions is taken out. However, for the vertical transfer segment at a single column, the signal charge is transferred to the vertical transfer channel 30 mainly through two vertical transfer electrodes. So for brevity of explanation, it is now assumed that the signal charge is taken out mainly using the driving pulses in the first phase and second phase.

Referring to FIG. 2 again, the schematic driving method for the solid-state image pick-up device 1e will be explained. The vertical transfer segments V1, V2, . . . , as schematically shown in FIG. 2, are arranged aside the photoelectric conversion regions correspondingly to the respective columns of the photoelectric conversion regions 1-1, 2-2, 1-3, . . . The transfer of the signal charge in the column direction is carried out in such a manner that the signal charge from the main region m and the signal charge from the subsidiary region s are individually read out onto the vertical transfer segments V1, V2, . . . , respectively. For example, the high sensitivity signal charge stored in the main region m is read out/transferred onto the vertical transfer channel 30, and outputted from the output segment 23. Thereafter, the low sensitivity signal charge stored in the subsidiary region s is read out/transferred onto the vertical transfer channel 30, and outputted from the output segment 23.

The horizontal transfer segment 21 is supplied with the signal charges transferred from the plurality of vertical transfer segments V1, V2, . . . , and transfers these signal charges in the row direction. The output segment 23 produces the voltage signal corresponding to the quantity of the signal charge transferred.

Specifically, the driving method according to this embodiment includes a step of individually reading/transferring the signal charges, onto said vertical transfer channel, from said high sensitivity photoelectric conversion element (main region m) and said low sensitivity photoelectric conversion element (subsidiary region s), respectively without executing a high speed charge transfer operation for the vertical transfer channels after exposure of said solid-state image pick-up device 1e.

Next, an explanation will be given of the details of the driving method of the above solid-state image pick-up device and an image pick-up method using the same.

Figure 4:
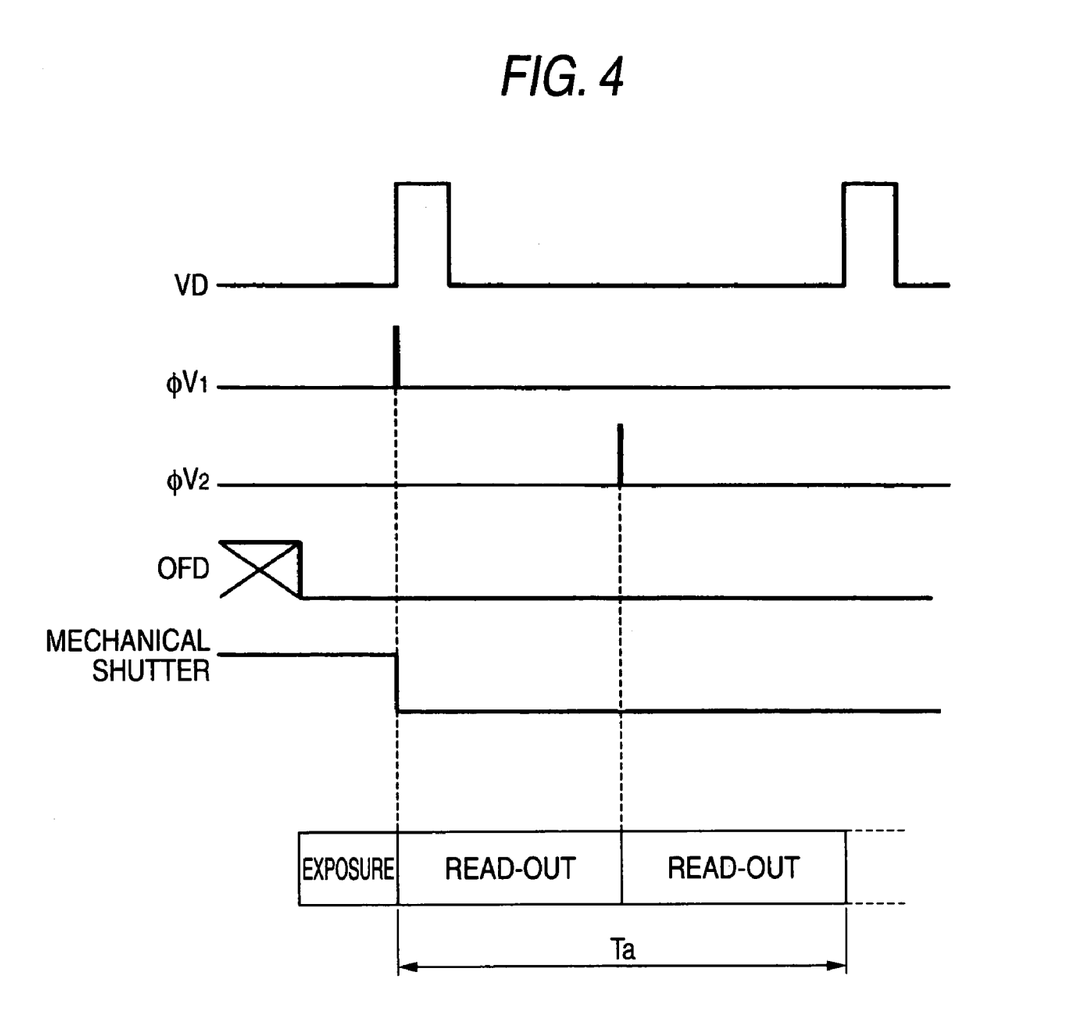
FIG. 4 is a timing chart for explaining the method for driving the solid-state image pick-up device to remove a smear component.

FIG. 4 is a timing chart for explaining the method for driving the solid-state image pick-up device to remove the smear component. Shown in FIG. 4 are a vertical synchronous signal VD, a read pulse ΦV1 applied to the terminal 36 (see FIG. 3), a read pulse ΦV2 applied to the terminal 35, a driving pulse OFD for an electronic shutter, and a driving signal for a mechanical shutter. It is assumed that the interval between the vertical synchronous signals VD is 1 field. The respective read pulses ΦV1 and ΦV2 are produced from the timing generator in the driving section 4.

In this driving method, the electronic shutter is driven so that the solid-state image pick-up device 1e is exposed. After the mechanical shutter is closed, in synchronism with the vertical synchronous signal VD, the read pulse ΦV1 is applied to the terminal 36. Thus, the signal charge accumulated or stored in the main region m of the photoelectric conversion region is read out through the charge reading region 31 onto the vertical transfer channel 30. Further, the driving pulses for high speed vertical transfer are repeatedly applied to the terminals 35 to 38, respectively to transfer the charges thus read in the column direction. In the vertical transfer channel 30, the charge (smear component) overflowed from the photoelectric conversion region in the exposure with high luminance may accumulate. However, this transfer in the column direction simultaneously transfers the smear component. Therefore the signal charge transferred in this case may contain the smear component. And from the horizontal transfer segment 21, the signal charge in the main region m read out from each of the photoelectric conversion regions corresponding to one row is transferred to the output segment 23 as required. Such a transfer is repeated until all the signal charges read out to the vertical transfer channel 30 are transferred to the output segment 23.

Upon completion of this transfer, the read pulse ΦV2 is applied to the terminal 35. Thus, the signal charge accumulated in the subsidiary region s of the photoelectric conversion region is read out onto the vertical transfer channel 30 through the charge read-out region 32. At the time of this read-out, since the smear component on the vertical transfer channel 30 has been already removed, the signal charge read out onto the vertical transfer channel 30 does not contain the smear component. Likewise, the driving pulses for high speed vertical transfer are repeatedly applied to the terminals 35 to 38, respectively to transfer the charges thus read in the column direction. And from the horizontal transfer segment 21, the signal charge in the subsidiary region s read out from each of the photoelectric conversion regions corresponding to one row is transferred to the output segment 23 as required.

In this way, the solid-state image pick-up device 1e individually reads out the charge (high sensitivity) from the main region m of the photoelectric conversion region and the charge (low sensitivity) from the subsidiary region s thereof, and also reads out the smear component in such a manner it is contained in the signal charge of the region precedently read. And since the smear component is contained in only the signal charge from the region precedently read, using this, the smear component is acquired on basis of the signal charge from the region subsequently read and the sensitivity difference between the main region m and the subsidiary region s. The signal based on the signal charge thus acquired is corrected.

Specifically, the signal charge from the main region m precedently read contains the signal component due to essential image pick-up and smear component due to noise, whereas the signal charge from the subsidiary region s subsequently read contains only the signal component with no smear component. Assuming that the sensitivity ratio k (for example, determined by an effective light receiving area ratio) of the high sensitivity main region m to the low sensitivity subsidiary region s is previously known, the smear component of each pixel can be acquired by the following equation (1)

The smear component=$\{(k \times \text{low sensitivity signal}) - \text{high sensitivity signal}\}/k$ (1)

Since the above relationship holds in a range where the high sensitivity signal is not saturated, performing this processing is not suitable after the high sensitivity signal exceeds the saturating point. So in the range where the saturating point is exceeded, computation of the smear component based on Equation (1) is not carried out.

Thus, in accordance with the above driving method, the high speed sweeping operation to the vertical transfer segment for removing the smear component is not required. For this reason, the time Ta taken for reading the entire image can be shortened. In addition, for the successive shot or snap shot requiring a high speed sequential image pick-up operation, the interval between image pick-up operations can be sufficiently shortened.

Specifically, the image pick-up method according to this embodiment includes the above charge transfer step; a smear component acquiring step of, using a signal based on the signal charge transferred from the high sensitivity photoelectric conversion element (main region m) and a signal based on the signal charge transferred from the low sensitivity photoelectric conversion element (subsidiary region s), acquiring a smear component contained in the signal based on the transferred signal charge; and a smear component correcting step of correcting the signal based on the signal charge from the either one of the photoelectric conversion elements (main region m or subsidiary region s) using the smear component thus acquired.

Figure 5:
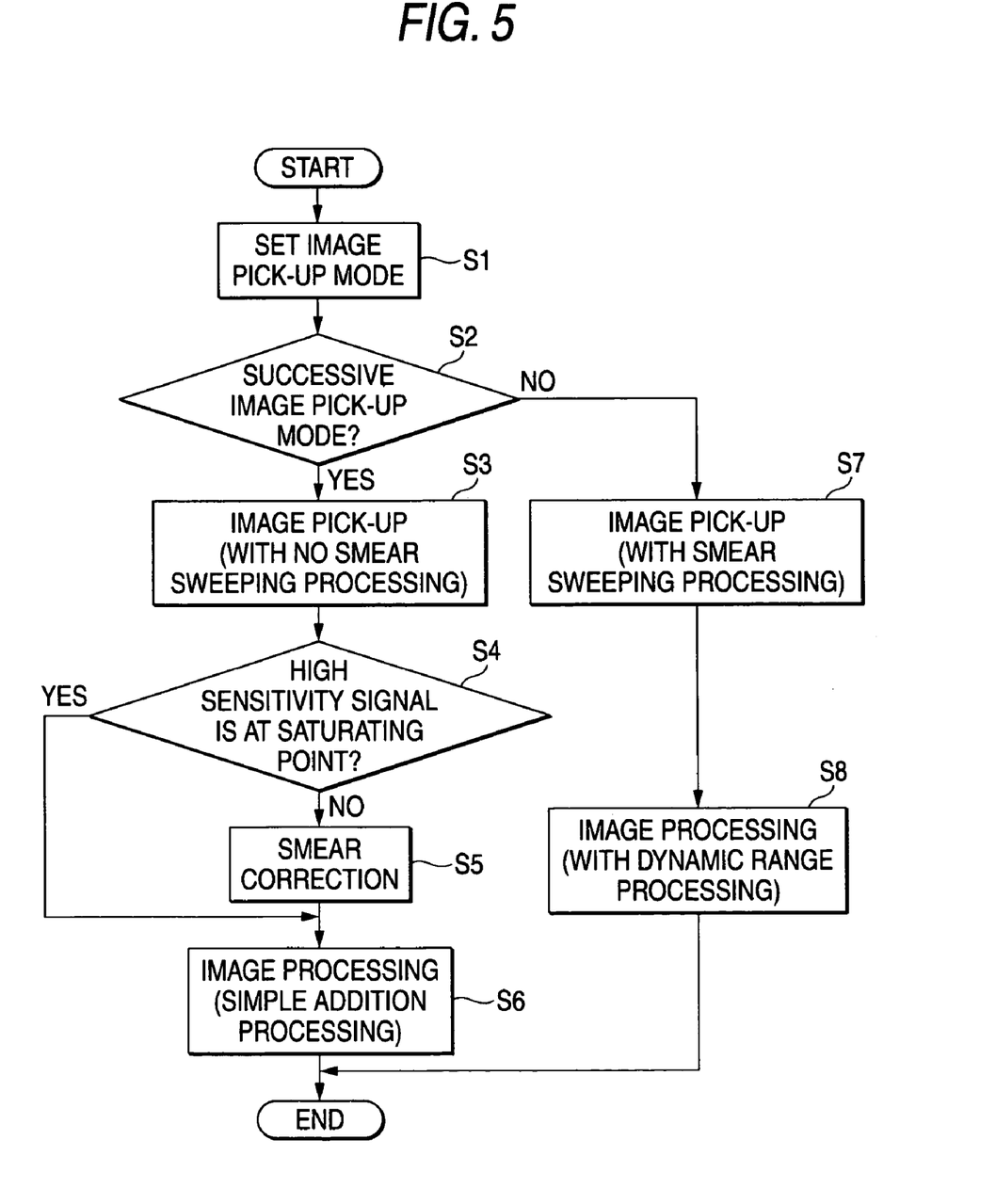
FIG. 5 is a flowchart which is an example of the An explanation will be given of the image pick-up method performing smear correction processing.

An explanation will be given of the image pick-up method performing smear correction processing, referring to a flowchart shown in FIG. 5 showing an example thereof.

First, the power of the digital camera 100 is turned on to set an operation mode at an image pick-up mode. Among a plurality of image pick-up modes previously prepared at this time, either one of the image pick-up modes is set (step 1, hereinafter referred to as S1). Next, it is determined whether or not the set image pick-up mode is a sequential image pick-up mode setting a short image pick-up interval (successive shot mode or the snap shot function is effective) (S2). If this image pick-up mode is selected, the image pick-up is performed by the driving method not doing the smear component sweeping operation prior to the above read of the signal charge (S3). Thus, the high speed image pick-up not requiring the high speed sweeping operation can be performed so that the image pick-up interval can be shortened.

After the image pick-up by the driving method not doing the high speed sweeping operation of the smear component, a saturation determining step is carried out in which it is determined whether or not the signal based on the signal charge acquired by this image pick-up exceeds a saturating point (S4). In this case, generally, the signal from the high sensitivity pixel exceeds the saturating point earlier than the low sensitivity pixel. So it is better to determine whether the signal from the high sensitivity pixel exceeds the saturating point. However in this embodiment, since the sensitivity ratio of the high sensitivity pixel to the low sensitivity pixel is previously known, it is determined whether the saturating point is exceeded using the signal from the low sensitivity pixel. This processing is executed in the digital signal processing section 7 which is supplied with the signal from the high sensitivity pixel (high sensitivity image data) and the signal from the low sensitivity pixel (low sensitivity image data) which have been digitized by the A/D conversion section 3.

If it is determined in S4 that the saturating point is not exceeded, the smear component is acquired from the above Equation (1). The smear component contained in the signal (high sensitivity image data) based on the signal charge read out precedently is removed (S5).

Next, the image data thus acquired is subjected to the image processing in the digital signal processing section 7(S6). The digital signal processing section 7 individually subjects the input signals based on the signal charges from the main region m and the subsidiary region s, i.e. the high sensitivity image data and low sensitivity image data to the OB processing, linear matrix correcting processing, white balance adjusting processing, and γ-correction processing, and thereafter composes the image data of the high sensitivity pixel and low sensitivity pixel having the same relative spectral sensitivity characteristic and being adjacent in the same positional relationship therewith. An example of this composing method is expressed by Equation (2).

$$S_C = S_H + S_L \quad (2)$$

where $S_C$ represents a composed signal, $S_H$ represents a high sensitivity image data, and $S_L$ represents a low sensitivity image data. In the case of the color image, the composed signal is acquired for each of red, green and blue.

Further, if it is determined in S4 that the saturating point is exceeded, the smear correction is not executed but the image processing in S6 is executed to acquire the composed signal.

On the other hand, if it is determined in S2 that the set image pick-up mode is not the sequential image pick-up mode setting a short image pick-up interval (successive shot mode or the snap shot function is effective), image pick-up processing is performed by the driving method including the normal high speed sweeping operation for the smear component (S7). Namely, in this case, the repetition of the image pick-up at a high speed is not necessarily required so that even if the high speed sweeping operation for the smear component is performed, a camera operator is not kept waiting because of the processing of the camera side until doing the subsequent image pick-up.

And in this case also, the high sensitivity image data and the low sensitivity data acquired by the image pick-up are the image processing in the digital signal processing section 7 (S8) The digital signal processing section 7 individually subjects the high sensitivity image data and low sensitivity image data to the OB processing, linear matrix correcting processing, white balance adjusting processing, and γ-correction processing, and thereafter composes the image data $S_H$ and $S_L$ of the high sensitivity pixel and low sensitivity pixel having the same relative spectral sensitivity characteristic and being adjacent in the same positional relationship therewith. An example of this composing method is expressed by Equation (3).

$$S_C = \alpha S_H + (1-\alpha) S_L \quad (3)$$

where α represents a coefficient for determining a composing ratio, and is set in the range of 0<α<1. The value of α is set at a suitable value according to a picked-up image scene.

Incidentally, in the image processing, the high sensitivity image data and low sensitivity image data of the picked up image are composed to finally create digital image data with a wide dynamic range. But the final digital image data may be created which contains only the high sensitivity image data or only the low sensitivity image data. In this case, the processing speed is improved thereby enabling a further high speed sequential image pick-up.

Further, the order of reading out the signal charge from the main region m and subsidiary region s of each of the photoelectric conversion regions of the solid-state image pick-up device 1e may be from the subsidiary region s to the main region m as well as from the main region m to the subsidiary region s. By inverting the order of transfer, even if the smear component is superposed on the signal charge for the subsidiary region s with the low sensitivity, which has a larger clearance to the saturating point than the main region m, the saturating point is difficult to be exceeded. Thus, the smear component can be effectively removed.

As understood from the description hitherto made, in accordance with the method for driving a charge-transfer type solid-state image pick-up device having the configuration according to this embodiment and the image pick-up method using the same, by individually reading/transferring the signal charges onto the vertical transfer channel from the high sensitivity photoelectric conversion elements and the low sensitivity photoelectric conversion elements without executing a high speed charge transfer operation for the vertical transfer channels after exposure of the solid-state image pick-up device; using a signal based on the signal charge transferred from the high sensitivity photoelectric conversion element and a signal based on the signal charge transferred from the low sensitivity photoelectric conversion element, acquiring a smear component contained in the signal based on the transferred signal charge; and correcting the signal based on the signal charge from the either one of the photoelectric conversion elements using the smear component thus acquired, the smear-corrected image can be created without using the high speed sweeping operation for the smear component. In addition, the time taken for reading the entire image can be shortened so that in the sequential image pick-up mode (in the image pick-up in the successive mode or during the snap shot doing the image pick-up by depressing the shutter release button plural number of times), the driving suitable to the image pick-up can be performed.

Further, even when the moving image is picked up, occurrence of the flicker or FPN caused by the smear component can be prevented, thereby providing the image signal with high quality.

Incidentally, the solid-state image pick-up device 1e may be, in addition to the configuration described above, a structure in which the high sensitivity photoelectric conversion elements and low sensitivity photoelectric conversion elements are arranged every other line in a square lattice shape. Namely, the high sensitivity photoelectric conversion element and low sensitivity photoelectric conversion element may consists of a plurality of photoelectric regions, respectively.

Figure 6:
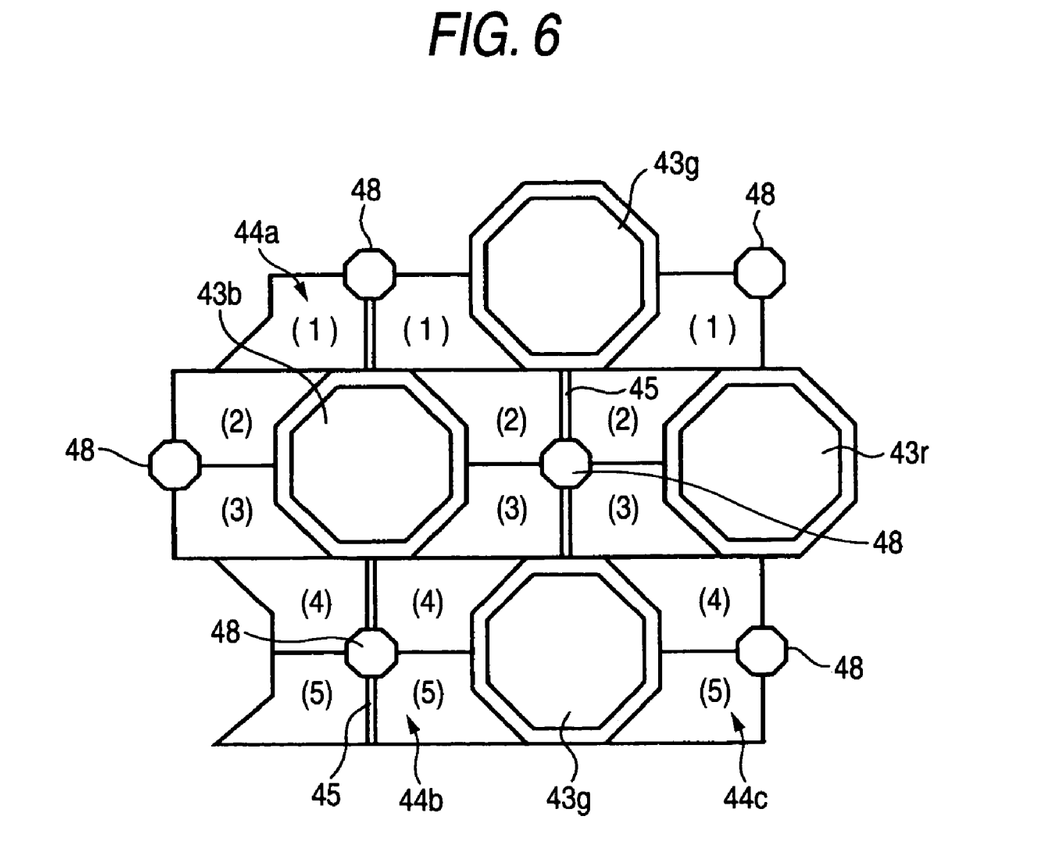
FIG. 6 shows a partial plan view of the solid-state image pick-up device which is an example of the structure in which high sensitivity photoelectric conversion elements and low sensitivity photoelectric conversion elements are arranged every other line in a square lattice shape.

FIG. 6 shows a partial plan view of the solid-state image pick-up device (CCD in this embodiment) which is one example of the structure in which the high sensitivity photoelectric conversion elements and low sensitivity photoelectric conversion elements are arranged every other line in a square lattice shape. Above each of the photodiodes (photoelectric conversion elements), the color filter and micro-lens (not shown) corresponding to each pixel color are provided.

Among the pixels 43r, 43g, 43b which are the high sensitivity conversion elements, the vertical transfer channels 44a, 44b, 44c, . . . , which extend in a zigzag shape in the column direction, are formed. The transfer electrodes for driving each of vertical transfer channels are formed one by one above and below each pixel (indicated by (1) to (5) in FIG. 6). When a predetermined voltage is applied to the corresponding transfer electrode, the charge of the pixel is read out to a lower position of the transfer position.

In the example shown in FIG. 6, the signal charge of the pixel 43b is read out/transferred onto the vertical transfer channel 44b; and the signal charge of the pixel 43g is read out/transferred onto the vertical transfer channel 44c.

The signal charge transferred is read out, for example, from the pixel 43b into the potential well formed below the transfer electrode (3). A predetermined voltage is successively applied to the transfer electrodes (1) to (5) so that the signal charges are transferred in the vertical direction.

A channel stop 45 separates the adjacent vertical transfer channels 44b, 44c from each other so that the potential wells are separated between the vertical transfer channels 44b, 44c. This applies to between the other adjacent vertical transfer channels.

In this embodiment, at a position among the sensitivity pixels 43r, 43g, 43b, 43g . . . , which serve as four high sensitivity photoelectric conversion elements, a low sensitivity pixel 48 which serves as the low sensitivity photoelectric conversion element is arranged.

The charge stored in the low sensitivity pixel 48 is stored in the corresponding transfer electrode (for example, the transfer electrode (2), (4) at an upper right position in FIG. 6), and transferred in the same manner as in the case of the high sensitivity pixel. By performing such a charge read-out, the charges stored in the high sensitivity pixel and low sensitivity pixel are individually read out.

Also in the solid-state image pick-up device having the above configuration, as in the previous embodiment, in acquiring the image with a wide dynamic range, the time taken for reading out the image signal can be shortened while removing the smear component.

In accordance with the method for driving a charge transfer type solid-state image pick-up device, and an image pickup method and an image pickup apparatus using the same, in acquiring the image with a wide dynamic range using a solid-state image pick-up device having photoelectric conversion elements with high sensitivity and a photoelectric conversion elements with low sensitivity, the read time of an image signal can be shortened while providing a configuration for removing a smear component.

The entire disclosure of each and every foreign patent application from which the benefit of foreign priority has been claimed in the present application is incorporated herein by reference, as if fully set forth.

What is claimed is:

1. An image pick-up method using a charge-transfer type solid-state image pick-up device wherein the charge-transfer type solid-state image pick-up device comprises: high sensitivity photoelectric conversion elements for executing photoelectric conversion with relatively high sensitivity; low sensitivity photoelectric conversion elements for executing photoelectric conversion with relatively low sensitivity; and vertical transfer channels for transferring signal charges from said high sensitivity photoelectric conversion elements and said low sensitivity photoelectric conversion elements, the method comprising:
    a charge transfer step of individually reading/transferring first signal charges from said high sensitivity photoelectric conversion elements and second signal charges from said low sensitivity photoelectric conversion elements onto said vertical transfer channels, without executing a high speed charge transfer operation for the vertical transfer channels after exposure of said solid-state image pick-up device;
    a smear component acquiring step of, using a first signal based on the first signal charges transferred and a second signal based on the second signal charges transferred, acquiring a smear component contained in one of the first signal and the second signal; and
    a smear component correcting step of correcting the one of the first signal and the second signal using said smear component thus acquired.

2. An image pick-up method according to claim 1, wherein
    said charge transfer step is to read/transfer the first signal charges and thereafter to read/transfer the second signal charges;
    said smear component acquiring step is to acquire a smear component contained in the first signal; and
    said smear component correcting step is to correct the first signal.

3. An image pick-up method according to claim 1, further comprising:
    a saturation determining step of determining whether or not the first signal has been saturated, wherein said smear component acquiring step and said smear component correcting step are executed if in said saturation determining step it is determined that the first signal has not been saturated.

4. An image pick-up method according to claim 3, wherein said saturation determining step uses: the second signal; and a sensitivity ratio of said high sensitivity photoelectric conversion elements to said low sensitivity photoelectric conversion elements.

5. An image pick-up apparatus comprising:
a solid-state image pick-up device;
an image pick-up driving section that drives said solid-state image pick-up device; and
a signal processing unit that processes a signal from said solid-state image pick-up device to produce digital image data of a picked-up image, wherein
said solid-state image pick-up device is a charge-transfer type solid-state image pick-up device comprising: high sensitivity photoelectric conversion elements for executing photoelectric conversion with relatively high sensitivity; low sensitivity photoelectric conversion elements for executing photoelectric conversion with relatively low sensitivity; and vertical transfer channels for transferring first signal charges from said high sensitivity photoelectric conversion elements and second signal charges from said low sensitivity photoelectric conversion elements, thereby producing a signal based on the first and second signal charges;
said image pick-up driving section individually reads/transfers the first signal charges and the second signal charges onto said vertical transfer channels, without executing a high speed charge transfer operation for the vertical transfer channels after exposure of said solid-state image pick-up device; and
said signal processing section has a smear component acquiring function of, using a first signal based on the first signal charges transferred and a second signal based on the second signal charges transferred, acquiring a smear component contained in one of the first signal and the second signal, and a smear component correcting function of correcting the one of the first signal and the second signal using said smear component thus acquired.

6. An image pick-up apparatus according to claim 5, wherein
said image pick-up driving section reads/transfers the first signal charges and thereafter reads/transfers the second signal charges;
said smear component acquiring function is to acquire a smear component contained in the first signal; and
said smear component correcting function is to correct the first signal.

7. An image pick-up apparatus according to claim 5, wherein
said signal processing section has a saturation determining function of determining whether or not the first signal has been saturated, and
said smear component acquiring function and said smear component correcting function are valid if in said saturation determining function it is determined that the first signal has not been saturated.

8. An image pick-up apparatus according to claim 7, wherein said saturation determining function is to determine whether or not the first signal has been saturated using the second signal and a sensitivity ratio of said high sensitivity photoelectric conversion elements to said low sensitivity photoelectric conversion elements.

9. An image pick-up apparatus according to claim 5, wherein
the image pick-up apparatus has a sequential image pick-up mode of executing continuous image pick-up and
said image pick-up driving section individually reads/transfers, in said sequential image pick-up mode,
the first signal charges and the second signal charges onto said vertical transfer channels, without executing a high speed charge transfer operation for the vertical transfer channels.

10. An image pick-up apparatus according to claim 5, wherein
said signal processing section creates digital image data of a picked-up image using the first signal.

11. An image pick-up apparatus according to claim 5, wherein
said signal processing section creates digital image data of a picked-up image by mixing the first signal with the second signal.

* * * * *